(No Model.)
W. J. HAMMER.
CONNECTING DEVICE FOR ELECTRICAL CONDUCTORS.
No. 368,764. Patented Aug. 23, 1887.
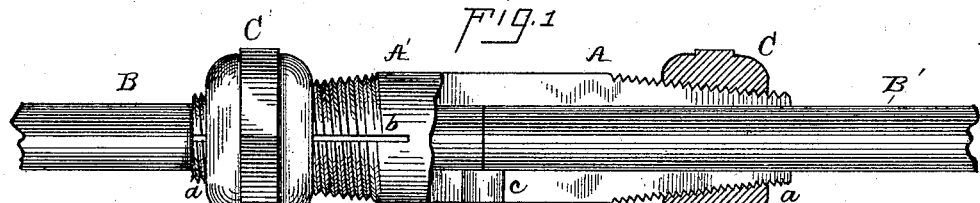
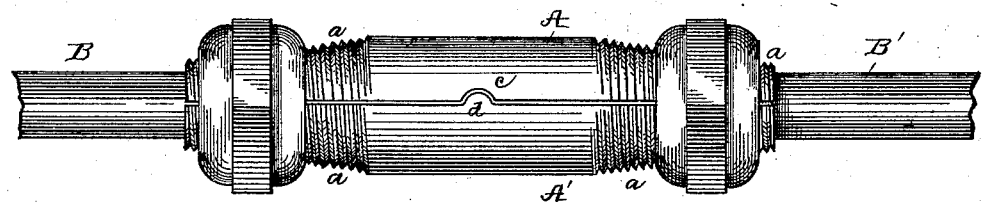
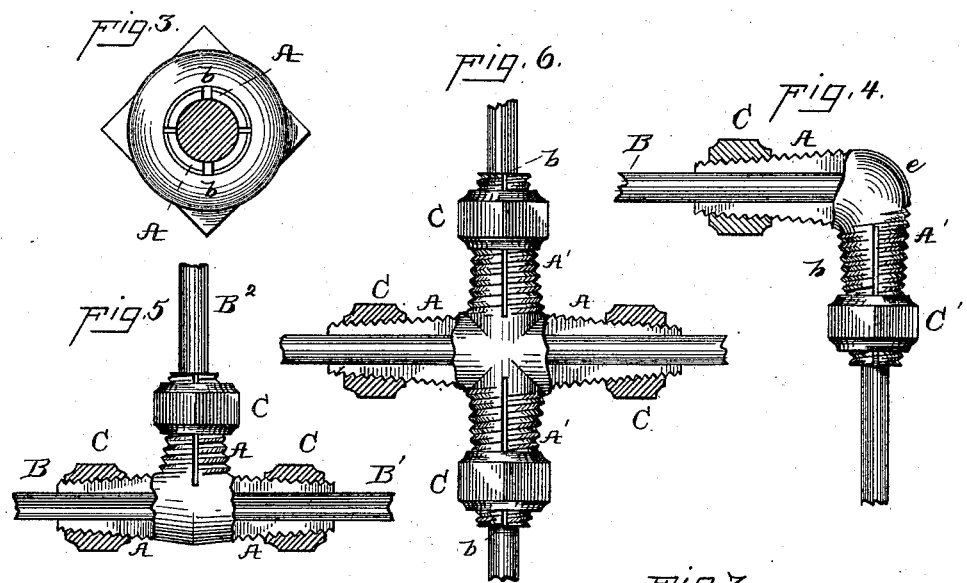
ATTEST:
INVENTOR:

UNITED STATES PATENT OFFICE.

WILLIAM J. HAMMER, OF BOSTON, MASSACHUSETTS, ASSIGNOR TO HIMSELF, AND FRANCIS R. UPTON, OF ORANGE, NEW JERSEY.

CONNECTING DEVICE FOR ELECTRICAL CONDUCTORS.

SPECIFICATION forming part of Letters Patent No. 368,764, dated August 23, 1887.

Application filed February 16, 1887. Serial No. 227,775. (No model.)

*To all whom it may concern:*

Be it known that I, WILLIAM J. HAMMER, of Boston, in the county of Suffolk and State of Massachusetts, have invented a certain new and useful Improvement in Connecting Devices for Electrical Circuits, of which the following is a specification.

The object of my invention is to provide a connecting device which shall enable good and secure electrical and mechanical connections to be made between wires forming parts of an electrical circuit; and my invention consists in the novel devices and combinations of devices employed by me in accomplishing the above-named object, as hereinafter set forth and claimed.

My invention is illustrated in the accompanying drawings, in which Figure 1 is a view of a coupling device embodying my invention in its simplest form, partly in horizontal section and partly in bottom plan view; Fig. 2, a side elevation of the same; Fig. 3, an end view of the same; Fig. 4, a view of a coupling for joining two wires at an angle; Fig. 5, a view of a coupling for joining three wires together; Fig. 6, a view of a coupling for joining four wires together; Fig. 7, a longitudinal vertical section of a modified form of my invention, and Fig. 8 a plan view of the same.

Referring, first, to Figs. 1, 2, and 3, the coupling therein shown consists of two longitudinal halves, A and A', adapted to be placed together upon and inclose the ends of the two wires B and B' to be joined together. The ends of these halves are beveled and screw-threaded, as at $a\, a$, so that when the two halves are placed together they form a complete sleeve with tapering screw-threaded extremities. Each end of each half of the sleeve is provided with a narrow slot or split, $b$, extending from the end thereof past the screw-threaded portion.

In order to guide and retain the two parts in the proper relative position, so that the screw-threads meet, the part A is provided with a notch or recess, $c$, in one of its edges, and the part A' has a corresponding projection or lug, $d$, which enters the notch $c$ when the parts are placed properly together. After the parts of the coupling-sleeve are thus placed together upon the wires the nuts C and C' are screwed upon the ends thereof. These nuts have beveled internal screw-threads. They are slipped upon the ends of the wires before the coupling-sleeve is placed thereon and are then screwed upon the ends of said sleeve, so as to force such ends closely upon the wire. Each end of the sleeve being divided into four parts, these parts are forced evenly together upon the wire, making firm and even contact therewith upon the whole internal surface of the sleeve, and so making a close and firm electrical connection and also a good mechanical union.

In Fig. 4 is shown a coupling for joining two wires, B and B', extending in directions at right angles to each other. In this form the two parts A and A' of the sleeve are each bent or turned at $e$. The ends are screw-threaded and tapering, as before, and each half of each end is also split at $b$. The two halves of the sleeve being placed together upon the ends of the wires, the nuts C and C' are screwed upon the sleeve and the wires are clamped therein.

The coupling shown in Fig. 5 is for joining three wires, B, B', and $B^2$, together, or for joining a branch wire, $B^2$, to a continuous main wire, B B'. Each half of the sleeve has three split beveled screw-threaded extensions, so that a coupling with three tapering extensions is formed, which receive the ends of the wires and on which the nuts are screwed.

Fig. 6 shows a four-way coupling, the sleeve being made in two parts and having four split tapering screw-threaded extremities for joining four wires together or two branch wires to a main wire.

In the form shown in Figs. 7 and 8, which is especially intended for pole lines or other places where the coupling is exposed to considerable mechanical strain, the coupling, as before, is in two halves, each having split screw-threaded beveled ends. Each half has a hole through it at $f$, and the ends of the wires are bent at $g$, so as to pass through these holes on each side, whereby they are securely held in the coupling. The nuts shown in this form have internal flanges, $h$, to assist in holding the wires more firmly.

What I claim is—

1. In a connecting device for electrical conductors, the combination of the sleeve made in two longitudinal halves, with split tapering screw-threaded ends for receiving the ends of the conductors, and the nuts screwed upon the ends thereof, substantially as set forth.

2. In a connecting device for electrical conductors, the sleeve made in two longitudinal parts, each of said parts having an aperture through it for receiving the bent end of a wire, in combination with the nuts screwed upon the ends of said sleeve, substantially as set forth.

This specification signed and witnessed this 12th day of February, 1887.

WM. J. HAMMER.

Witnesses:
WM. PEZER,
E. C. ROWLAND.